Oct. 14, 1958 K. HEATHCOTE ET AL 2,856,148
VALVE ASSEMBLY
Filed Dec. 29, 1952
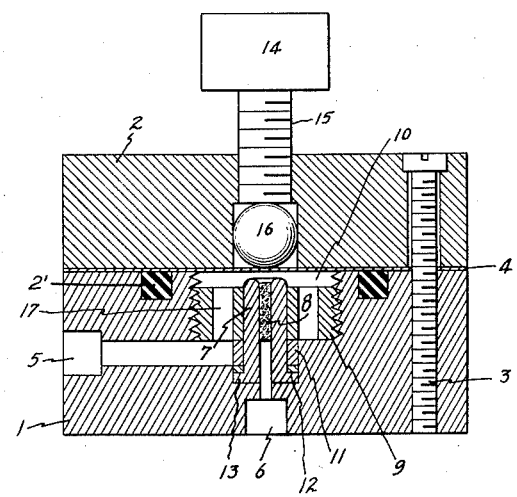
Inventors:
Kenneth Heathcote,
Jack Blears,
by Paul G. Frank
Their Attorney.

United States Patent Office 2,856,148
Patented Oct. 14, 1958

2,856,148

VALVE ASSEMBLY

Kenneth Heathcote, Stretford, and Jack Blears, Davenham, England, assignors to Metropolitan-Vickers Electrical Company Limited, London, England, a British company Application December 29, 1952, Serial No. 328,494

Claims priority, application Great Britain February 8, 1952

1 Claim. (Cl. 251—127)

This invention relates to valve assemblies for controlling small fluid flows. More particularly the invention relates to on-off type valves for controlling small gas flows in cases where the maximum flow is predetermined to an appropriate degree of accuracy. The invention is applicable, for example, for controlling the flow through a capillary tube or porous block or through a single hole diaphragm.

In such cases the pressures are normally very low and of the order, for example, of one percent of an atmosphere, and it is important, therefore, that the apparatus shall permit rapid and positive changes between on and off positions.

According to one of its aspects, which is not necessarily its broadest, the present invention comprises an on-off gas valve for controlling the gas flow through a duct offering restriction to such flow, comprising a flexible metal diaphragm extending laterally across the end of said duct with a slight clearance, together with a pressure pad or bearing member and means whereby the pressure pad may be either caused to press the diaphragm against a seating surrounding the end of the duct to close it, or alternatively, may be released to permit gas flow through the duct.

Pressure may be applied to the pressure pad either by means of a screwed spindle which presses against it, or, alternatively, the pressure may be applied electromagnetically, for example, by means of a solenoid plunger.

According to a preferred form of the invention the restriction duct containing the flow restricting member is detachable and interchangeable so that an appropriate duct containing a flow restricting member having predetermined flow resistance may be inserted to obtain the required gas flow.

One application of the invention is in controlling the flow between a reservoir and a source of vacuum, e. g. a mass spectrometer, in which case it permits of two positions in one of which the flow is at a maximum rate and in the other entirely cut off.

In order that the invention may be clearly understood, reference will now be made to the sole, cross-sectional view of the accompanying drawing, in which the reference numeral 1 indicates a valve block and 2 a cover which is held onto the block by means of screws 3 (one of which is shown) suitably arranged around the block. Cover 2 may be sealed in fluid-tight relation to valve block 1 by means of a rubber sealing ring 2'. The block 1 and cover 2 are preferably of non-corrosive metal, for example, stainless steel. Between the coacting faces of the block and cover is a metal diaphragm 4, which is also of a suitable non-corrosive and flexible metal such as stainless steel or beryllium copper. The reference numeral 5 represents the gas inlet and 6 the gas outlet, while 7 is the restriction duct, the passage through which includes a flow restricting member, e. g., a porous block 8. The flow restricting characteristics of porous members such as block 8 may be controlled by manipulating the effective porosity of the plug either by varying the granule size of the plug member to determine general porosity or by varying the length of the porous plug 8 along the restriction duct 7. Thus, whenever the valve assembly is open the maximum flow through the valve assembly is determined by the flow resistance of the porous plug 8. Restriction duct 7 may be considered as constituting a reduced diameter portion of outlet duct 6. Restriction duct 7 is held in position by means of a nut 9 which engages a screw thread around the side of a recess 10, and, acting through a spacer 11 and lead gasket 12, bears against the flange 13 on the duct 7. In the position shown in the drawing it will be observed that the upper end of the restriction duct 7 has slight clearance from the diaphragm 4 so that there is a restricted gas passage between the inlet duct 5 and the outlet duct 6. In order to close this passage it is necessary to turn the knob 14 on the screwed spindle 15, so as to cause a pressure pad 16 to press the diaphragm down onto the upper edge of the restriction duct 7 and thus seal it.

It will be appreciated that the duct 7 is of relatively small diameter; consequently it is important that the seating around the upper end shall be suitably rounded to present a smooth surface to the diaphragm, and, furthermore, that the diaphragm shall be of sufficient strength to withstand wear due to it being pressed against the seating. For this reason it is preferable that the diaphragm shall be of metal and not of material such as plastic or rubber.

It will also be appreciated that such a construction makes it possible for the restriction to be readily changed since all that is necessary is to take off the cover and unscrew the nut 9 by means of a suitable tool engaging the ports 17, at least one of which provides a portion of an interconnecting passageway for fluid flow through the valve. The duct 7 may then be lifted out and replaced by another containing a porous member 8 having suitable flow restricting characteristics. Normally, it is contemplated that there would be a number of such ducts calibrated to different maximum flows.

In operation several of such ducts may be connected in parallel, each being connected between a different gas source and a reservoir or other space to which gas is to be delivered. It will be appreciated that a rapid change may be made between one gas and another since the movement of the pressure pad 16 may be arranged to be relatively short by making the clearance in the open position between the diaphragm 4 and the upper end of the duct 7 small. This is possible because the maximum flow to be provided for is also quite small. Furthermore, when the valve is shut off, the dead space below the side of the porous block 8 and the delivery duct 6 is quite small.

What we claim as new and desire to secure by Letters Patent of the United States is:

A valve assembly for controlling low fluid flow rates comprising, a valve block having a recessed portion, an outlet duct extending through said valve block and communicating with said recessed portion, an inlet duct extending through said valve block and also communicating with said recessed portion, a portion of said outlet duct extending into said recessed portion and forming a dished valve seat; a porous flow restricting member having a predetermined resistance to fluid flow disposed within and completely filling a portion of said outlet duct, the portion of said outlet duct containing said porous member being removable whereby porous members of different flow restricting characteristics may be utilized, a flexible metal diaphragm spaced from said valve seat, a movable pressure pad adapted to bear against said diaphragm whereby said diaphragm may be brought to bear in fluid-tight relation against said valve seat to close said valve or can be withdrawn to permit fluids to flow through said valve at a rate determined by said flow restricting porous member.

References Cited in the file of this patent

UNITED STATES PATENTS

| | | |
|---|---|---|
| 597,445 | Toof | Jan. 18, 1898 |
| 619,216 | Phillips | Feb. 7, 1899 |
| 1,118,649 | Halter | Nov. 24, 1914 |
| 1,782,578 | McCune | Nov. 25, 1930 |
| 2,236,253 | Testori | Mar. 25, 1941 |
| 2,439,673 | Roper | Apr. 13, 1948 |
| 2,476,310 | Langdon | July 19, 1948 |
| 2,509,834 | Moore | May 30, 1950 |
| 2,515,394 | Clarkson | July 18, 1950 |
| 2,612,728 | Jacobsson | Oct. 7, 1952 |

FOREIGN PATENTS

| | | |
|---|---|---|
| 58,760 | Sweden | Mar. 5, 1925 |
| 230,774 | Switzerland | Apr. 17, 1944 |